United States Patent
Blagodurov et al.

(10) Patent No.: US 11,860,755 B2
(45) Date of Patent: *Jan. 2, 2024

(54) HARDWARE ASSISTED MEMORY PROFILING AGGREGATOR

(71) Applicant: Advanced Micro Devices, Inc., Santa Clara, CA (US)

(72) Inventors: Sergey Blagodurov, Calabasas, CA (US); Jinyoung Choi, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,435

(22) Filed: Jul. 11, 2022

(65) Prior Publication Data

US 2022/0342786 A1    Oct. 27, 2022

Related U.S. Application Data

(63) Continuation of application No. 17/130,665, filed on Dec. 22, 2020, now Pat. No. 11,385,983.

(51) Int. Cl.
*G06F 11/00* (2006.01)
*G06F 11/30* (2006.01)
(Continued)

(52) U.S. Cl.
CPC ........ *G06F 11/3037* (2013.01); *G06F 11/076* (2013.01); *G06F 11/3471* (2013.01); *G06F 11/3476* (2013.01)

(58) Field of Classification Search
CPC .. G06F 11/3409; G06F 11/3013; G06F 11/34; G06F 11/3466
See application file for complete search history.

(56) References Cited

U.S. PATENT DOCUMENTS 7,290,254 B2    10/2007   Comp et al.
10,540,218 B2    1/2020   Freitag et al.
(Continued)

OTHER PUBLICATIONS

Blagodurov, U.S. Appl. No. 17/130,665, filed Dec. 22, 2020, Notice of Allowance and Fees Due, dated Apr. 18, 2022.
(Continued)

*Primary Examiner* — Charles Ehne
(74) *Attorney, Agent, or Firm* — HICKMAN BECKER BINGHAM LEDESMA LLP (57) ABSTRACT

An approach is provided for implementing memory profiling aggregation. A hardware aggregator provides memory profiling aggregation by controlling the execution of a plurality of hardware profilers that monitor memory performance in a system. For each hardware profiler of the plurality of hardware profilers, a hardware counter value is compared to a threshold value. When a threshold value is satisfied, execution of a respective hardware profiler of the plurality of hardware profilers is initiated to monitor memory performance. Multiple hardware profilers of the plurality of hardware profilers may execute concurrently and each generate a result counter value. The result counter values generated by each hardware profiler of the plurality of hardware profilers are aggregated to generate an aggregate result counter value. The aggregate result counter value is stored in memory that is accessible by a software processes for use in optimizing memory-management policy decisions.

23 Claims, 4 Drawing Sheets

(51) Int. Cl.
  *G06F 11/07*     (2006.01)
  *G06F 11/34*     (2006.01)

(56) References Cited

U.S. PATENT DOCUMENTS

2010/0281482 A1* 11/2010 Pike .................. G06F 9/5044
                                                         718/102
2018/0074750 A1*  3/2018 Dudas ................ G06F 3/0655
2022/0197768 A1   6/2022 Blagodurov et al.

OTHER PUBLICATIONS

Blagodurov, U.S. Appl. No. 17/130,665, filed Dec. 22, 2020, Non-Final Rejection, dated Dec. 21, 2021.

* cited by examiner

HARDWARE ASSISTED MEMORY PROFILING AGGREGATOR

CLAIM OF PRIORITY

This application claims the benefit as a Continuation of prior U.S. patent application Ser. No. 17/130,665, titled "HARDWARE ASSISTED MEMORY PROFILING AGGREGATOR", filed Dec. 22, 2020, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

With the Double Data Rate (DDR) memory standard facing density challenges and the emergence of the non-volatile memory technologies such as Cross-Point, phase change, and fast FLASH media, compute and memory vendors are contending with a paradigm shift in the data-center space. The decades-long status quo of designing servers with dynamic random-access memory (DRAM) technology as an exclusive memory solution is coming to an end. Future systems will increasingly employ tiered memory architectures (TMAs) in which multiple memory technologies work together to satisfy applications' ever growing demands for more memory, less latency, and greater bandwidth. Exactly how to expose each memory type to software is an open question.

Recent systems, such as Cascade Lake, have focused on hardware caching to leverage faster DRAM memory while exposing slower non-volatile memory to operating system (OS) addressable space. The hardware approach that deals with the non-uniformity of TMA, however, requires complex changes to the processor and cannot use fast memory to increase a system's overall memory capacity. Mapping an entire TMA as OS-visible memory alleviates the challenges of the hardware approach but pushes the burden of managing data placement in the TMA to the software layers. The software, however, does not see the memory accesses by default; in order to make informed memory scheduling decisions, software must rely on hardware methods to gain visibility into the load/store address stream. The software then uses this information to place data in the most suitable memory location.

The issue with the many hardware memory profiling methods that currently exist in systems is that they are not standardized. As a result, software does not know how to combine multiple hardware memory profiling methods to create a single, unified vision of its memory accesses. Thus, there is a need for an approach for supporting multiple key hardware monitoring features available across modern processor architectures that facilitates the guidance of memory-management policy decisions.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments are be practiced without these specific details. In other instances, well-known structures and devices are shown in block diagram form in order to avoid unnecessarily obscuring the embodiments.

I. Overview
II. Architecture
III. Memory Profiling Aggregator
IV. Microcode Execution Examples

I. Overview

An approach is provided for implementing memory profiling aggregation. A hardware aggregator provides memory profiling aggregation by controlling the execution of a plurality of hardware profilers that monitor memory performance in a system. For each hardware profiler of the plurality of hardware profilers, a hardware counter value is compared to a threshold value. When a threshold value is satisfied, execution of a respective hardware profiler of the plurality of hardware profilers is initiated to monitor memory performance. When a threshold value is no longer satisfied, execution of the respective hardware profiler is stopped. Multiple hardware profilers of the plurality of hardware profilers may execute concurrently and each generate a result counter value. The result counter values generated by each hardware profiler of the plurality of hardware profilers are aggregated to generate an aggregate result counter value. The aggregate result counter value is stored in memory that is accessible by a software processes for use in optimizing memory-management policy decisions.

Techniques discussed herein support multiple key hardware monitoring features available across modern processor architectures and achieve low profiling overhead while maximizing informativeness. In addition, techniques discussed herein allow multiple memory profiling methods to be used in unison to provide standardized profiling statistics for optimizing memory-management policy decisions.

II. Architecture

Figure 1:
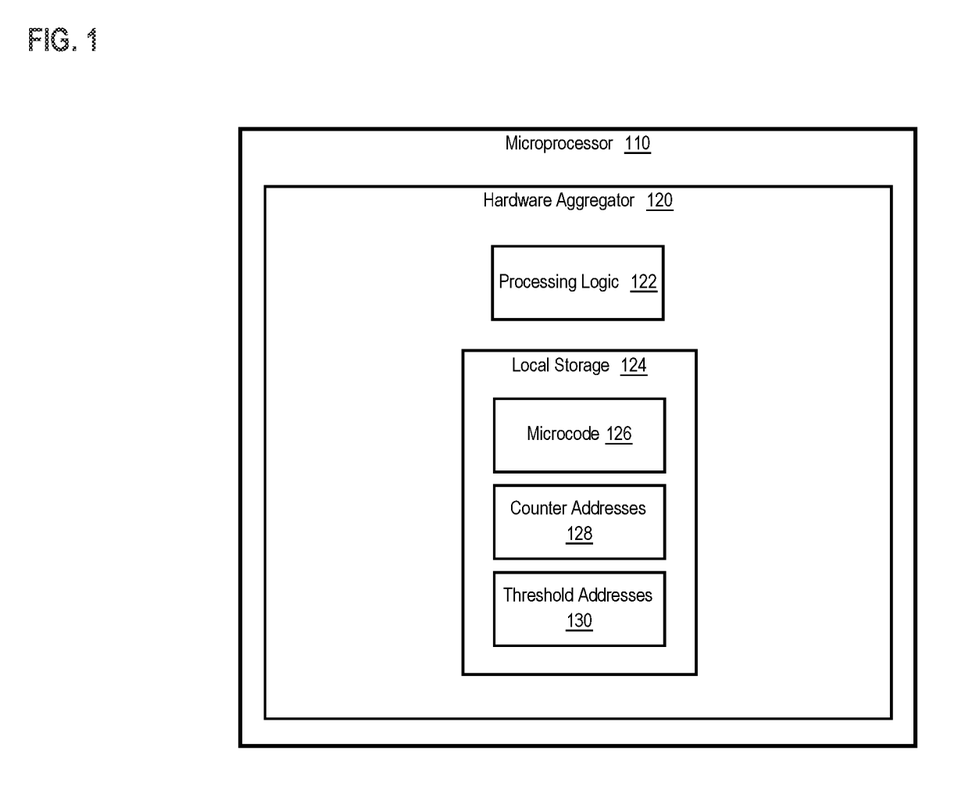
FIG. 1 is a block diagram that depicts a hardware aggregator for implementing memory profiling aggregation as described herein.

FIG. 1 is a block diagram that depicts a hardware aggregator 120 for implementing memory profiling aggregation as described herein. Hardware aggregator 120 includes processing logic 122 and local storage 124.

In one embodiment, such as shown in FIG. 1, hardware aggregator 120 exists as part of microprocessor 110. The microprocessor 110 may be any type of Central Processing Unit (CPU), Graphics Processing Unit (GPU) or logic capable of processing commands. The microprocessor 110 may include any number of cores that may vary depending upon a particular implementation and embodiments are not limited to any particular number of cores.

Processing logic 122 may be any type of Central Processing Unit (CPU), Graphics Processing Unit (GPU) or logic capable of processing and/or executing microcode 126.

Local storage 124 includes microcode 126, counter addresses 128 and threshold addresses 130. Microcode 126 includes hardware-level instructions that can control, coordinate, and in some cases perform operations required by hardware aggregator 120. For example, microcode 126 may comprise microcode for a plurality of hardware profilers that each monitor performance of memory. Examples of microcode 126 are further discussed herein.

Counter addresses 128 includes a plurality of memory addresses or IDs for accessing counter values. For example, counter addresses 128 may store one or more memory addresses that correspond to different hardware counter values.

Threshold addresses 130 includes a plurality of memory addresses or IDs for accessing threshold values. For example, threshold addresses 130 may store one or more memory addresses that correspond to different threshold values.

In some embodiments, counter addresses 128 and threshold addresses 130 may be preloaded and periodically updated via basic input/output system (BIOS). In some embodiments, counter addresses 128 and threshold addresses 130 may be set using software.

In other embodiments, hardware aggregator may include other elements not described herein. For example, aggregator may include a bank of local registers for storing counter values and/or threshold values.

In some embodiments, hardware aggregator 120 is associated with a memory controller or a last level cache that exists between processing logic and memory.

III. Memory Profiling Aggregator

TABLE 1 describes various hardware profilers that perform memory monitoring operations in a system:

TABLE 1

Hardware Profilers

| Hardware Profiler | Overhead? | Granularity | Descriptiveness |
|---|---|---|---|
| Performance Monitoring Counters (PMCs) | very low | coarse (per thread/last level cache) | very low (single number for many accesses) |
| PTE's Accessed-bit tracking | Depends on PIDs tracked + may require a TLB shootdown | medium (per page) | low (detects first TLB miss since last reset) |
| Trace-based | depends on sampling rate | fine (per access) | depends on sampling rate |
| Memory Access Monitor | low | medium (per page) | medium (access count per page) |

As shown in TABLE 1, each hardware profiler may specialize in different aspects of memory monitoring. For example, the Memory Access Monitor (MAM) hardware profiler specializes in low overhead for GPU memory accesses but only has medium granularity and descriptiveness. As another example, the Performance Monitoring Counters (PMCs) hardware profiler specializes in very low overhead for CPUs and GPUs but has a low descriptiveness.

A hardware aggregator 120 can be used to combine multiple hardware profilers to maximize informativeness and minimize overhead of memory monitoring. In one embodiment, hardware aggregator 120 is configured to determine whether a first threshold value is satisfied by comparing a first hardware counter value to the first threshold value. The first threshold value defines a threshold value that, when satisfied, triggers execution of a hardware profiler that is associated with the first threshold value. For example, the first threshold value or a threshold value in general may indicate a threshold count of cache misses, a threshold count of page faults, or a threshold count of TLB misses stored in a register accessible by hardware aggregator 120. The first hardware counter value defines a hardware counter value. For example, the first hardware counter value or a hardware counter value in general may be a count of cache misses, a count of page faults, or a count of TLB misses stored in a register accessible by hardware aggregator 120. The first threshold value and first hardware counter value are retrieved by the hardware aggregator 120 using threshold addresses 130 and counter addresses 128 stored in local storage 124 of the hardware aggregator 120.

Once the first hardware counter value and the first threshold value are retrieved, hardware aggregator 120 compares the first threshold value to the first hardware counter value. If hardware aggregator 120 determines that the first threshold value is satisfied by the first hardware counter value, hardware aggregator 120 initiates execution of a first hardware profiler of a plurality of hardware profilers to monitor memory performance. Each hardware profiler of the plurality of hardware profilers comprises a set of instructions, such as microcode 126 stored in local storage 124 of hardware aggregator 120. In one embodiment, the execution of a hardware profiler of the plurality of hardware profilers is initiated by processing logic 122 causing instructions for the first hardware profiler to be executed.

In an embodiment, because hardware counter values such as the first hardware counter value may change as the first hardware profiler is executing, hardware aggregator 120 performs periodic comparisons of the first threshold value to the first hardware counter value while the first hardware profiler is executing. If hardware aggregator 120 determines, during execution of the first hardware profiler, that the first threshold value is not satisfied, hardware aggregator causes execution of the first hardware profiler to stop.

Additional hardware counter values can be compared to additional threshold values to determine whether to initiate execution of additional hardware profilers of the plurality of hardware profilers. For example, the hardware aggregator may determine whether a second threshold value is satisfied by comparing a second hardware counter value to the second threshold value. In response to determining that the first threshold value is satisfied, hardware aggregator 120 initiates execution of a second hardware profiler of the plurality of hardware profilers to monitor memory performance.

In some embodiments, multiple hardware profilers are executed concurrently. For example, a second hardware profiler may be executed concurrently with a first hardware profiler.

In some embodiments, in a scenario where a first hardware profiler is executing, when a threshold value associated with a second hardware profiler is satisfied, execution of the second hardware profiler is initiated, and execution of the first hardware profiler is stopped. For example, if the second hardware profiler requires resources to execute that are currently being consumed by other hardware profilers such as the first hardware profiler, when the threshold value associated with the second hardware profiler is satisfied, execution of the second hardware profiler is initiated and execution of the first hardware profiler is stopped. Using this technique, resources that are consumed by the execution of the first hardware profiler can be allocated to the execution of the second hardware profiler.

To incorporate new profiling methods for memory monitoring, hardware aggregator 120, which in some embodiments may associated with a memory controller, maintains local storage 124 that includes hardware profilers available on a given system. Local storage 124 includes (a) microcode 126 for performing memory monitoring via a given hardware profiler and (b) memory addresses for hardware counter values 128 and memory addresses for the associated threshold values 130 that determine when to enable/disable various hardware profilers. In one embodiment, the local storage 124 may be preloaded and periodically updated via BIOS.

In some embodiments, hardware profilers are configured to store result counter values. For example, by executing a first hardware profiler, the first hardware profiler generates a result counter value that comprises a memory performance metric. Hardware aggregator 120 aggregates the result counter values that result from the execution of multiple hardware profilers to generate an aggregate result counter value. The aggregate result counter value is an aggregate memory performance metric that can be used by software processes to perform memory management operations such as optimizing memory-management policy decisions.

In some embodiments, a result counter value generated by a hardware profiler is assigned a weight based on the hardware profiler that the result counter value is associated with. For example, a first result counter value generated by a first hardware profiler may be assigned a first weight and a second result counter value generated by a second hardware profiler may be assigned a second weight. The weighted values are then combined into the aggregate result counter value and made accessible to a software process.

Figure 2:
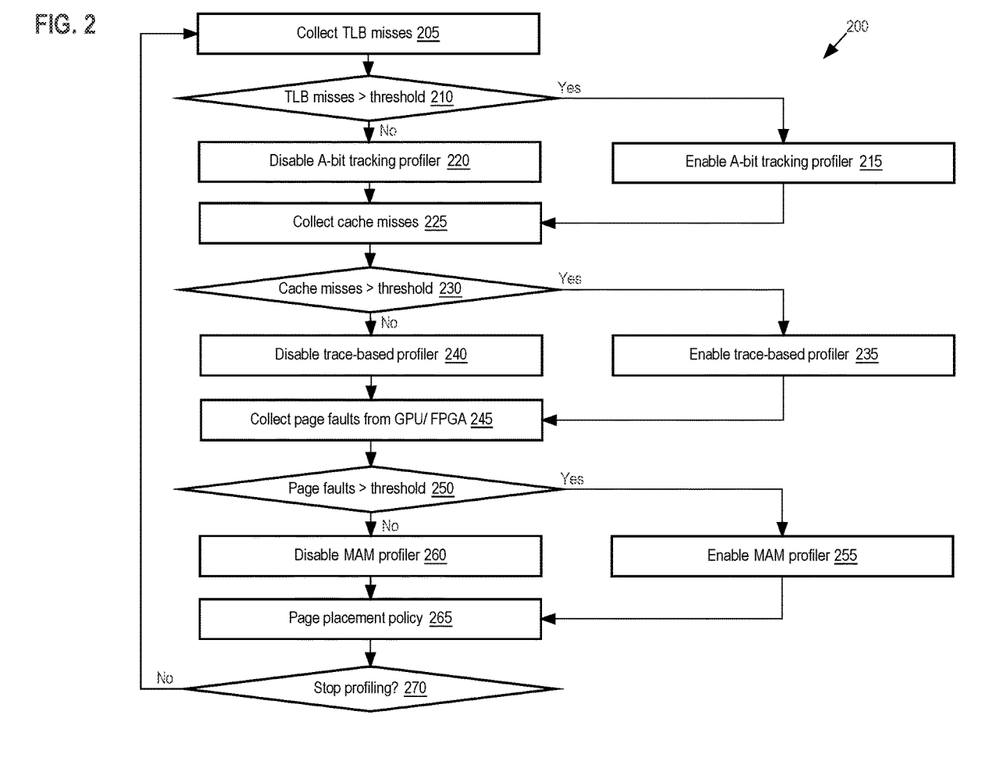
FIG. 2 is a flow diagram that depicts an approach for performing memory profiling aggregation using a hardware aggregator.

FIG. 2 is a flow diagram 200 that depicts an approach for performing memory profiling aggregation using hardware aggregator 120.

In this example, specific hardware profilers and hardware counter value types are used to illustrate an example of hardware profiler aggregation, but embodiments are not limited to this example and embodiments include using other types of hardware profilers and associated hardware counter value types.

In step 205, translation lookaside buffer (TLB) misses are collected and stored as a hardware counter value in a register that is accessible by hardware aggregator 120.

In step 210, hardware aggregator 120 compares the TLB misses to a threshold value that is associated with an accessed-bit tracking hardware profiler to determine whether the TLB misses satisfy the threshold value. The threshold value is stored in a register that is accessible by hardware aggregator 120.

In step 215, if hardware aggregator 120 determines in step 210 that the TLB misses exceed or satisfy the threshold value that is associated with the accessed-bit tracking hardware profiler, the accessed-bit tracking hardware profiler is enabled and begins execution. By executing the accessed-bit tracking hardware profiler, a result counter value is generated that indicates a memory performance metric. Execution of the accessed-bit tracking hardware profiler is further described in FIG. 3.

In step 220, if hardware aggregator 120 determines in step 210 that the TLB misses do not exceed or satisfy the threshold value that is associated with the accessed-bit profiling hardware profiler, the accessed-bit tracking hardware profiler is disabled. In a situation where the accessed-bit tracking hardware profiler is already executing, the execution of the accessed-bit tracking hardware profiler is stopped.

In step 225, cache misses are collected and stored as a hardware counter value in a register that is accessible by hardware aggregator 120.

In step 230, hardware aggregator 120 compares the cache misses to a threshold value that is associated with a trace-based hardware profiler to determine whether the cache misses satisfy the threshold value. The threshold value is stored in a register that is accessible by hardware aggregator 120.

In step 235, if hardware aggregator 120 determines in step 230 that the cache misses exceed or satisfy the threshold value that is associated with the trace-based hardware profiler, the trace-based hardware profiler is enabled and begins execution. By executing the trace-based hardware profiler, a result counter value is generated that indicates a memory performance metric. Execution of the trace-based hardware profiler is further described in FIG. 4.

In step 240, if hardware aggregator 120 determines in step 230 that the cache misses do not exceed or satisfy the threshold value that is associated with the trace-based hardware profiler, the trace-based hardware profiler is disabled. In a situation where the trace-based hardware profiler is already executing, the execution of the trace-based hardware profiler is stopped.

In step 245, page faults are collected from a GPU/FPGA and stored as a hardware counter value in a register that is accessible by hardware aggregator 120.

In step 250, hardware aggregator 120 compares the page faults to a threshold value that is associated with a memory access monitor hardware profiler to determine whether the page faults satisfy the threshold value. The threshold value is stored in a register that is accessible by hardware aggregator 120.

In step 255, if hardware aggregator 120 determines in step 250 that the page faults exceed or satisfy the threshold value that is associated with the memory access monitor hardware profiler, the memory access monitor hardware profiler is enabled and begins execution. By executing the memory access monitor hardware profiler, a result counter value is generated that indicates a memory performance metric.

In step 260, if hardware aggregator 120 determines in step 250 that the page faults do not exceed or satisfy the threshold value that is associated with the memory access monitor hardware profiler, the memory access monitor hardware profiler is disabled. In a situation where the memory access monitor hardware profiler is already executing, the execution of memory access monitor hardware profiler is stopped.

In step 265, the result counter values that are generated by each of the accessed-bit tracking hardware profiler, the trace-based hardware profiler, and the memory access monitor hardware profiler are aggregated to generate an aggregate result counter value. The aggregate result counter value is used by a page placement policy implemented by software to perform memory management operations.

In step 270, hardware aggregator 120 determines whether to stop memory profiling operations. If hardware aggregator 120 determines to stop memory profiling operations, flow 200 stops. If hardware aggregator 120 determines to continue memory profiling operations, the flow proceeds to step 205.

IV. Microcode Execution Examples

Figure 3:
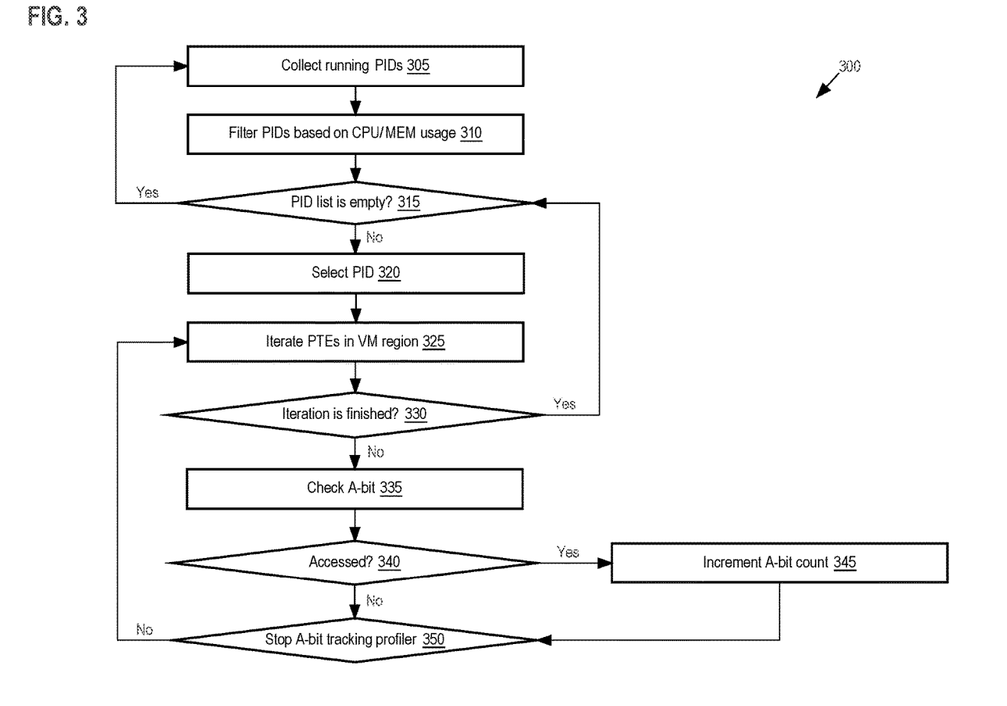
FIG. 3 is a flow diagram that depicts an approach for executing an accessed-bit tracking hardware profiler.

FIG. 3 is a flow diagram 300 that depicts an approach for executing an accessed-bit tracking hardware profiler. In one embodiment, executing the accessed-bit tracking hardware profiler comprises processing logic 122 causing a set of instructions from microcode 126 that corresponds to the accessed-bit tracking hardware profiler to be executed.

In step 305, the accessed-bit tracking hardware profiler collects all IDs of running processes (PIDs) from a system.

In step 310, the accessed-bit tracking hardware profiler generates a list of processes that are occupying system resources such as CPU or memory and filters the list of processes by resource usage. For example, the accessed-bit tracking hardware profiler selects processes with at least 5% CPU or 10% memory in order to reduce the number of page tables traversed for accessed-bit collection.

In step 315, the accessed-bit tracking hardware profiler determines whether the filtered PID list is empty. If the filtered PID list is empty, the flow proceeds back to step 305 where the accessed-bit tracking hardware profiler collects PIDs of running processes from the system. If the filtered PID list is not empty, the flow proceeds to step 320 where the accessed-bit tracking hardware profiler selects a PID from the filtered PID list.

In step 325, the accessed-bit tracking hardware profiler iterates the page mapping of the virtual memory space for the process corresponding to the PID selected in step 320.

In step 330, the accessed-bit tracking hardware profiler determines whether the iteration of page table entries is finished. If the iteration is finished, the flow proceeds back to step 315. If the iteration is not finished, the flow proceeds to step 335 where the accessed-bit tracking hardware profiler checks the accessed-bit of the page table entry for the current iteration.

In step 340, the accessed-bit tracking hardware profiler determines whether the accessed-bit is checked. If the accessed-bit is checked, i.e. if the accessed-bit is set to 1, the flow proceeds to step 345 where the accessed-bit result counter value of the page is incremented inside the hardware aggregator 120.

In step 350, the accessed-bit tracking hardware profiler determines whether the accessed-bit tracking is finished. If the accessed-bit tracking is not finished iterating through page table entries, the flow proceeds back to step 325. If the accessed-bit tracking is finished iterating through page table entries, the accessed-bit result counter value is then shared with a software process.

Figure 4:
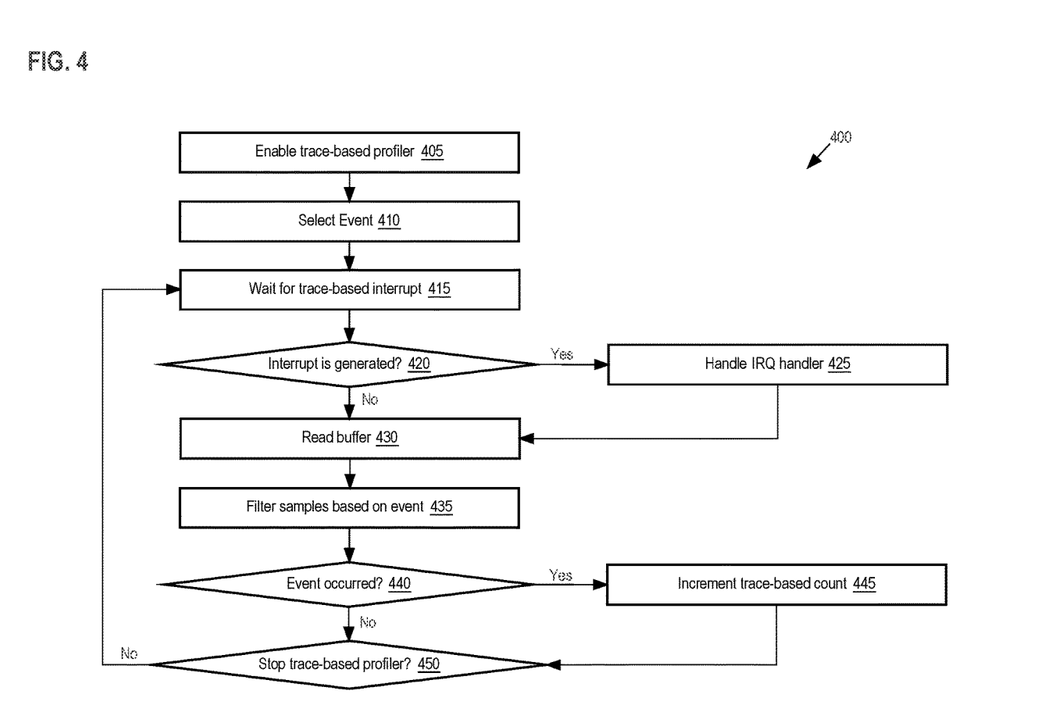
FIG. 4 is a flow diagram that depicts an approach for executing a trace-based hardware profiler.

FIG. 4 is a flow diagram 400 that depicts an approach for executing a trace-based hardware profiler. In one embodiment, executing the trace-based hardware profiler comprises processing logic 122 causing a set of instructions from microcode 126 that corresponds to the trace-based hardware profiler to be executed.

In step 405, the trace-based hardware profiler is enabled.

In step 410, the trace-based hardware profiler selects an event to collect pages based on. For example, events such as L1 cache, L2 cache or last level cache (LLC) misses may be selected.

In step 415, the trace-based hardware profiler waits for an interrupt. For example, the trace-based hardware profiler waits for an Instruction-Based Sampling (IBS) and/or Processor Event-Based Sampling (PEBS) interrupt.

In step 420, the trace-based hardware profiler determines if an interrupt is generated. If the trace-based hardware profiler determines that an interrupt is generated, the flow proceeds to step 425 where a IRQ handler is handled by the trace-based hardware profiler. If the trace-based hardware profiler determines that an interrupt is not generated, the flow proceeds to step 430 where a buffer is read by the trace-based hardware profiler. For example, the trace-based hardware profiler may use machine-specific registers (MSR) to collect memory-trace samples into a buffer and use a register interrupt handler to indicate when the tracing buffer is full.

In step 435, the trace-based hardware profiler filters samples based on event.

In step 440, the trace-based hardware profiler determines if an event occurred. If the trace-based hardware profiler determines that an event occurred, the flow proceeds to step 445 where the trace-based result counter value that is stored for each page is incremented. If the trace-based hardware profiler determines that an event has not occurred, the flow proceeds to step 450 where the trace-based hardware profiler determines whether to stop the execution of the trace-based hardware profiler In step 450, the trace-based hardware profiler determines whether the trace-based tracking is finished. If the trace-based tracking is not finished, the flow proceeds back to step 415. If the trace-based tracking is finished, the trace-based result counter value is then shared with a software process.

In one embodiment, hardware aggregator 120 takes advantage of the trace-based hardware profiler as shown in FIG. 4 to inspect memory accessed from the unified last level caches (i.e., if the data source is out of local, combined level 3 LLCs). The hardware aggregator 120 supplements this information with the accessed-bit profiling hardware profiler as shown in FIG. 3 to gain visibility into memory accesses from the TLB caches (a.k.a. cache misses of the address translation path). The trace-based result counter value is aggregated with the accessed-bit result counter value to generate an aggregate result counter value, which is then made accessible to a software process. The aggregate result counter value comprises memory profiling statistics for optimizing memory-management policy decisions.

The invention claimed is:

1. A processor comprising:
   a plurality of hardware profilers executing concurrently on the processor; and
   a hardware aggregator comprising local storage, wherein the hardware aggregator is configured to aggregate, in the local storage, result counter values from the plurality of hardware profilers executing concurrently on the processor to generate an aggregate result counter value.

2. The processor of claim 1, wherein the hardware aggregator is further configured to initiate execution of a particular hardware profiler, from the plurality of hardware profilers, in response to a threshold value for the particular hardware profiler being satisfied.

3. The processor of claim 1, wherein the hardware aggregator is further configured to cause execution of a particular hardware profiler, from the plurality of hardware profilers, to stop in response to a threshold value for the particular hardware profiler no longer being satisfied.

4. The processor of claim 1, wherein the hardware aggregator is further configured to:
   assign a first weight to a first result counter value generated by a first hardware profiler, from the plurality of hardware profilers, and assign a second weight to a second result counter value generated by a second hardware profiler, from the plurality of hardware profilers, and generate the aggregate result counter value based on the first weight assigned to the first result counter value and the second weight assigned to the second result counter value.

5. The processor of claim 1, wherein the hardware aggregator is further configured to generate the aggregate result counter value by combining two or more result counters values from two or more hardware profilers from the plurality of hardware profilers.

6. The processor of claim 1, wherein:
the hardware aggregator comprises processing logic,
each hardware profiler from the plurality of hardware profilers is implemented by instructions stored in the local storage, and
execution of a particular hardware profiler, from the plurality of hardware profilers, is initiated by the processing logic causing instructions for the particular hardware profiler in the local storage to be executed.

7. The processor of claim 1, wherein:
the hardware aggregator comprises processing logic, and
the hardware aggregator is further configured to:
store the result counter values from the plurality of hardware profilers in the local storage, and
generate the aggregate result counter value using the result counter values stored in the local storage.

8. The processor of claim 1, wherein:
the local storage stores one or more addresses in a memory where the result counter values from the plurality of hardware profilers are stored, and
the hardware aggregator is further configured to use the one or more addresses stored in the local storage to access the result counter values from the plurality of hardware profilers.

9. The processor of claim 1, wherein:
the local storage stores an address in a memory where a threshold value for a particular hardware profiler is stored, and
the hardware aggregator is further configured to use the address stored in the local storage to access the threshold value for the particular hardware profiler, wherein the threshold value for the particular hardware profiler is used to one or more of initiate or end execution of the particular hardware profiler.

10. The processor of claim 1, wherein the processor is a central processing unit or a graphics processing unit.

11. The processor of claim 1, wherein the hardware aggregator is associated with a memory controller or a last level cache of the processor, and each hardware profiler, from the plurality of hardware profilers, is configured to monitor memory performance.

12. The processor of claim 1, wherein the plurality of hardware profilers includes one or more of: a performance monitoring counter hardware profiler, an accessed-bit tracking hardware profiler, a trace-based hardware profiler or a memory access monitor hardware profiler.

13. The processor of claim 1, wherein the processor further comprises global storage, and wherein the local storage of the hardware aggregator is independent from the global storage.

14. The processor of claim 1, wherein the hardware aggregator further comprises processing logic, and a memory controller between the processing logic and the local storage.

15. The processor of claim 1, wherein the processor further comprises general purpose registers, and wherein the local storage of the hardware aggregator comprises a bank of local registers that are independent from the general purpose registers.

16. A method comprising:
aggregating, by a hardware aggregator in a processor, result counter values in a local storage of the hardware aggregator, wherein the result counter values are retrieved from a plurality of hardware profilers executing concurrently on the processor to thereby generate an aggregate result counter value in the local storage.

17. The method of claim 16, further comprising initiating, by the hardware aggregator, execution of a particular hardware profiler, from the plurality of hardware profilers, in response to a threshold value for the particular hardware profiler being satisfied.

18. The method of claim 16, further comprising causing, by the hardware aggregator, execution of a particular hardware profiler, from the plurality of hardware profilers, to stop in response to a threshold value for the particular hardware profiler no longer being satisfied.

19. The method of claim 16, further comprising assigning, by the hardware aggregator, a first weight to a first result counter value generated by a first hardware profiler, from the plurality of hardware profilers, a second weight to a second result counter value generated by a second hardware profiler, from the plurality of hardware profilers, and generating the aggregate result counter value based on the first weight assigned to the first result counter value and the second weight assigned to the second result counter value.

20. The method of claim 16, further comprising generating, by the hardware aggregator, the aggregate result counter value by combining two or more result counters values from two or more hardware profilers from the plurality of hardware profilers.

21. The method of claim 16, wherein:
the hardware aggregator comprises processing logic and a local storage,
each hardware profiler from the plurality of hardware profilers is implemented by instructions stored in the local storage, and
the method further comprises initiating, by the processing logic, execution of a particular hardware profiler, from the plurality of hardware profilers, by causing instructions for the particular hardware profiler in the local storage to be executed.

22. The method of claim 16, wherein the hardware aggregator is associated with a memory controller or a last level cache of the processor, and each hardware profiler, from the plurality of hardware profilers, is configured to monitor memory performance.

23. The method of claim 16, wherein the plurality of hardware profilers includes one or more of: a performance monitoring counter hardware profiler, an accessed-bit tracking hardware profiler, a trace-based hardware profiler or a memory access monitor hardware profiler.

* * * * *